United States Patent
Cloutier et al.

(10) Patent No.: US 8,590,796 B1
(45) Date of Patent: Nov. 26, 2013

(54) CARDS HAVING DYNAMIC MAGNETIC STRIPE COMMUNICATION DEVICES FABRICATED FROM MULTIPLE BOARDS

(75) Inventors: Bruce S. Cloutier, Jeanette, PA (US); James H. Workley, Imperial, PA (US); David N. Lambeth, Pittsburgh, PA (US); Jeffrey D. Mullen, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 206 days.

(21) Appl. No.: 12/710,259

(22) Filed: Feb. 22, 2010

Related U.S. Application Data

(60) Provisional application No. 61/166,909, filed on Apr. 6, 2009, provisional application No. 61/220,501, filed on Jun. 25, 2009, provisional application No. 61/234,406, filed on Aug. 17, 2009, provisional application No. 61/247,143, filed on Sep. 30, 2009.

(51) Int. Cl.
*G06K 19/02* (2006.01)

(52) U.S. Cl.
USPC .......................... 235/488; 235/449; 235/493

(58) Field of Classification Search
USPC ........................ 235/493, 380, 441, 449, 488
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |

(Continued)

FOREIGN PATENT DOCUMENTS

| JP | 05210770 A | 8/1993 |
|---|---|---|
| WO | WO9852735 | 11/1998 |

(Continued)

OTHER PUBLICATIONS

The Bank Credit Card Business. Second Edition, American Bankers Association, Washington, D.C., 1996.

(Continued)

*Primary Examiner* — Karl D Frech

(57) ABSTRACT

A card is fabricated by fixing together multiple boards. By fabricating a card from multiple boards, the reliabilities of the individual boards may be tested independently. Failure of a single board component may not, for example, result in failure of a card so long as the reliability of a single board is determined before the single board component is fixed to the other board component(s).

17 Claims, 9 Drawing Sheets

(56) References Cited

U.S. PATENT DOCUMENTS

| | | |
|---|---|---|
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,020,775 B2 * | 9/2011 | Mullen et al. .................. 235/493 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty et al. |
| 2004/0162732 A1 | 8/2004 | Rahim et al. |
| 2004/0172535 A1 | 9/2004 | Jakobsson et al. |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |

(56) References Cited

U.S. PATENT DOCUMENTS

| | | |
|---|---|---|
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

A Day in the Life of a Flux Reversal. http://www.phrack.org/issues.html?issue=37&id=6#article. As viewed on Apr. 12, 2010.

Dynamic Virtual Credit Card Numbers. http://homes.cerias.purdue.edu/~jtli/paper/fc07.pdf. As viewed on Apr. 12, 2010.

English translation of JP 05210770 A.

English translation of JP 05210770 A, May 20, 1993.

U.S. Appl. No. 60/594,300, Poidomani et al.

U.S. Appl. No. 60/675,388, Poidomani et al.

* cited by examiner

700

CARDS HAVING DYNAMIC MAGNETIC STRIPE COMMUNICATION DEVICES FABRICATED FROM MULTIPLE BOARDS

CROSS-REFERENCE TO RELATED APPLICATIONS

This application claims the benefit of U.S. Provisional Patent Application Nos. 61/166,909 filed on Apr. 6, 2009, 61/220,501 filed on Jun. 25, 2009, 61/234,406 filed on Aug. 17, 2009, and 61/247,143 filed on Sep. 30, 2009, all of which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader. A magnetic emulator may include one or more coils. Each coil may be utilized to communicate a particular track of magnetic stripe data to a magnetic stripe track read-head of a magnetic stripe reader. For example, two coils may be utilized to communicate two tracks of magnetic stripe data to two read-heads inside a read-head housing.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, compute vision equipment such as barcode readers may be less acceptable to errors in reading a displayed barcode.

A dynamic magnetic stripe communications device may be fabricated and assembled on one board at one facility while a different facility may fabricate and assemble a different board with, for example, a card's processor, dynamic magnetic communications device driver circuitry, user interfaces, read-head detectors, light emitting devices, displays, batteries, and any other type of sensor, device, or associated circuitry. The facility fabricating the board having c a card's primary circuitry may receive the board having the dynamic magnetic stripe communications device from a different facility and may assemble the two boards together. The combined electronics package may then, for example, be provided to a lamination facility for lamination. Alternatively, for example, lamination may occur at the facility that assembled the dynamic magnetic stripe communications device board and the primary circuit board together. The laminated card may then be provided to a personalization facility for personalization. During personalization, for example, a customer's personal data may be placed on the exterior of the card (e.g., printed, embossed, or laser etched) as well as programmed into a processor's memory.

Accordingly, the primary circuit boards for different types of cards may be manufactured independently of the dynamic magnetic communications devices. Accordingly, different facilities may be dedicated to manufacturing different types of cards. One facility, for example, may be dedicated to the manufacture of primary card boards for payment cards having displays. Another facility, for example, may be dedicated to the manufacture of primary card boards for security cards not having any displays. In this manner, dynamic magnetic stripe communications devices may be fabricated at dedicated facilities in high volume. These dynamic magnetic stripe communication devices may then be shipped to the various other facilities fabricating the primary boards for different types of cards.

In manufacturing multiple boards dedicated to particular functions, and later assembling these multiple boards together, for example, the reliability of the different boards may be tested separately before assembling. Additionally, for example, the dynamic magnetic communication device boards may be fabricated in a higher volume than the boards for the circuitry of any one card. In doing so, the costs associated with the fabrication of dynamic magnetic communication device boards may be decreased.

A dynamic magnetic communications device may be fabricated on a flexible circuit board by, for example, providing a multiple layer flexible board (e.g., a two layer flexible printed circuit board). A coil for each track of information may be provided by including wire segments on each layer and interconnecting these wire segments through layer interconnections to create a coil. For example, a dynamic magnetic communications device may include two coils such that two tracks of information may be communicated to two different read-heads included in a read-head housing of a magnetic stripe reader. A dynamic magnetic communications device may include three coils such that three tracks of information may be communicated serially to three different read-heads included in a read-head housing of a magnetic stripe reader.

Such a two layer board may include one or more strips of material located between the board layers. Such strips of material may form, for example, a core to an associated coil. Particularly, two to eight strips of material may be provided in each coil. More particularly, three or four strips of a material may be provided in each coil. Each strip may be fabricated from the same or a different material. For example, three strips of a Cobalt-based amorphous material may be provided. Such a Cobalt-based material may include, for example, amounts of Boron, Iron, Nickel, and Silicon. Strips (e.g., three strips in a coil) may be, for example, strips of an amorphous alloy-transverse field annealed material. Strips may be of the same material in a particular coil but different from the material in an adjacent coil. The strips may be a flexible, soft-magnetic material.

A magnet may be provided over each coil. Accordingly, a single magnet may be provided over multiple coils. Such a magnet may be, for example, a hard magnetic material or neodymium magnet (e.g., a bonded neodymium magnet). Such a magnet may be, for example, cross-magnetized. A magnet may be, for example, fixed (e.g., glued) to a surface of the coil formed from a multiple-layer flexible printed circuit board. Additionally, for example, a magnet may be compressed or injection molded against one or more coils (e.g., bond to the coil or coils). Coils, core-forming strips, and magnets may be, for example, between two and three and a half inches long (e.g., approximately three inches long). One or more exterior magnets may be provided on either, or both, sides of a coil. A coil, any associated interior strips, and any associated exterior magnets may have substantially a similar length. An exterior magnet may have a width that spans across multiple coils (e.g., two or three coils).

A card may include multiple buttons and each button may be associated with a different card or feature. Alternatively, for example, a card may include a single button, but that single button may be used to, for example, toggle between multiple products. For example, pressing a button on a card a first time may cause a first payment product to be communicated via a dynamic magnetic stripe communications device. Pressing that button on that card a second time may, however, cause a second payment product to be communicated via that dynamic magnetic stripe communications device. Accordingly, a user may utilize a single button to toggle between multiple payment products. Such payment products may include a debit product, credit product, gift product, pre-paid product, or any other type of product. For example, a card may include two credit accounts, where each credit account is associated with a different association (e.g., Discover, MasterCard, Visa, American Express) or each credit account is associated with the same association.

Multiple boards may be soldered together. Different boards may also be mechanically and electrically coupled together, for example, via an epoxy or conductive tape. Particular components of each card may then be, for example, assembled onto the boards. For example, a microprocessor die may be coupled to contacts of a portion of a board. The electronics package may then be laminated. Such a lamination may occur, for example, in an injection molding process (e.g., a reaction injection molding process). A laminate may be, for example, a silicon-based material or a polyurethane-based material.

Cards may be personalized via receiving various types of wireless signals. For example, a card may include an infrared sensor. A personalization machine may include an IR transmitter. The IR transmitter may communicate personal data, such as one or more credit and/or debit card numbers, to an IR sensor located on the card. Similarly, a visible light sensor may be provided on a card for receiving visible light pulses from a visible light transmitter that are indicative of personal data for a card. Alternatively, for example, a wire-based signal may be provided to a card for personalization. For example, a card may include an IC chip that has contacts exposed on the surface of the card. Electrical connections may be made to such exposed contacts to provide personal data into the chip. Contacts may be placed on the card and connected to an embedded, non-exposed microprocessor such that the microprocessor may receive programming data from a wire-based connection.

An adapter may be provided that includes an infrared or visible light transmitter. Such an adapter may be provided over a contact for an IC chip communications device. Accordingly, an IC chip communications device may provide electronic signals to program, for example, an IC-chip card. However, an adapter may convert, for example, these electronic signals into visible or infrared bursts of light.

Accordingly, an IC chip programmer may be utilized to program a card having an infrared or visible light sensor. Furthermore, for example, an adapter may placed over a magnetic stripe encoder or an RFID signal generator that generates infrared or visible light pulses in response to magnetic stripe encoding signals or RFID programming signals.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
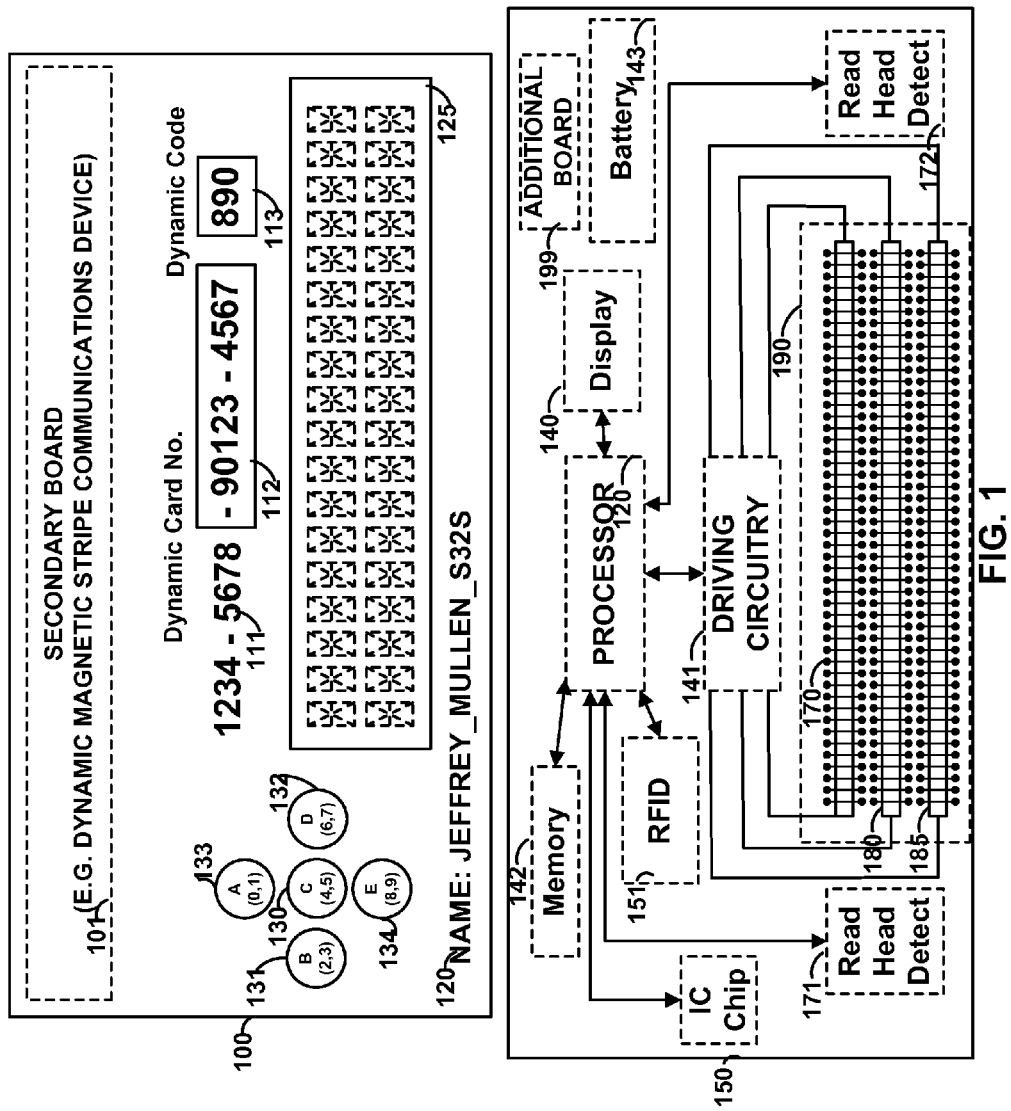
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 131-134. Such buttons may be mechanical buttons, capacitive buttons, or a combination or mechanical and capacitive buttons. A dynamic magnetic stripe communications device may be provided for communicating magnetic stripe data to a magnetic stripe reader. Such a device may, for example, be provided on a secondary, flexible printed circuit board that is electrically and mechanically connected to a primary flexible printed circuit board that includes the electronics package for a card other than, for example, the dynamic magnetic stripe communications device. Any additional circuitry may be provided on secondary board 101. For example, driver circuitry for a dynamic magnetic stripe communications device, or capacitive read-head detectors may be provided on secondary board 101 in addition to a dynamic magnetic stripe communications device.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120.

Memory 142 may include data that is unique to a particular card. For example memory 142 may include magnetic stripe data for one, or multiple cards. Additionally, memory 142 may store additional discretionary data that is associated with various features. Accordingly, a user may select a feature and discretionary data associated with that feature may be retrieved from memory 142 and provided with stored magnetic stripe data and other discretionary data to form one or more magnetic stripe data tracks. Memory 142 may be, for example, provided on the die of processor 120. Battery 143 may be coupled to contacts on a primary board (e.g., board having processor 120). Any number of additional flexible, printed circuit boards may be mechanically and electrically coupled to a primary circuit board. For example, additional board 199 may be provided.

Any number of reader communication devices may be included in architecture 150. For example, IC chip 150 may be included to communicate information to an IC chip reader. IC chip 150 may be, for example, an EMV chip. As per another example, RFID 150 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 150, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
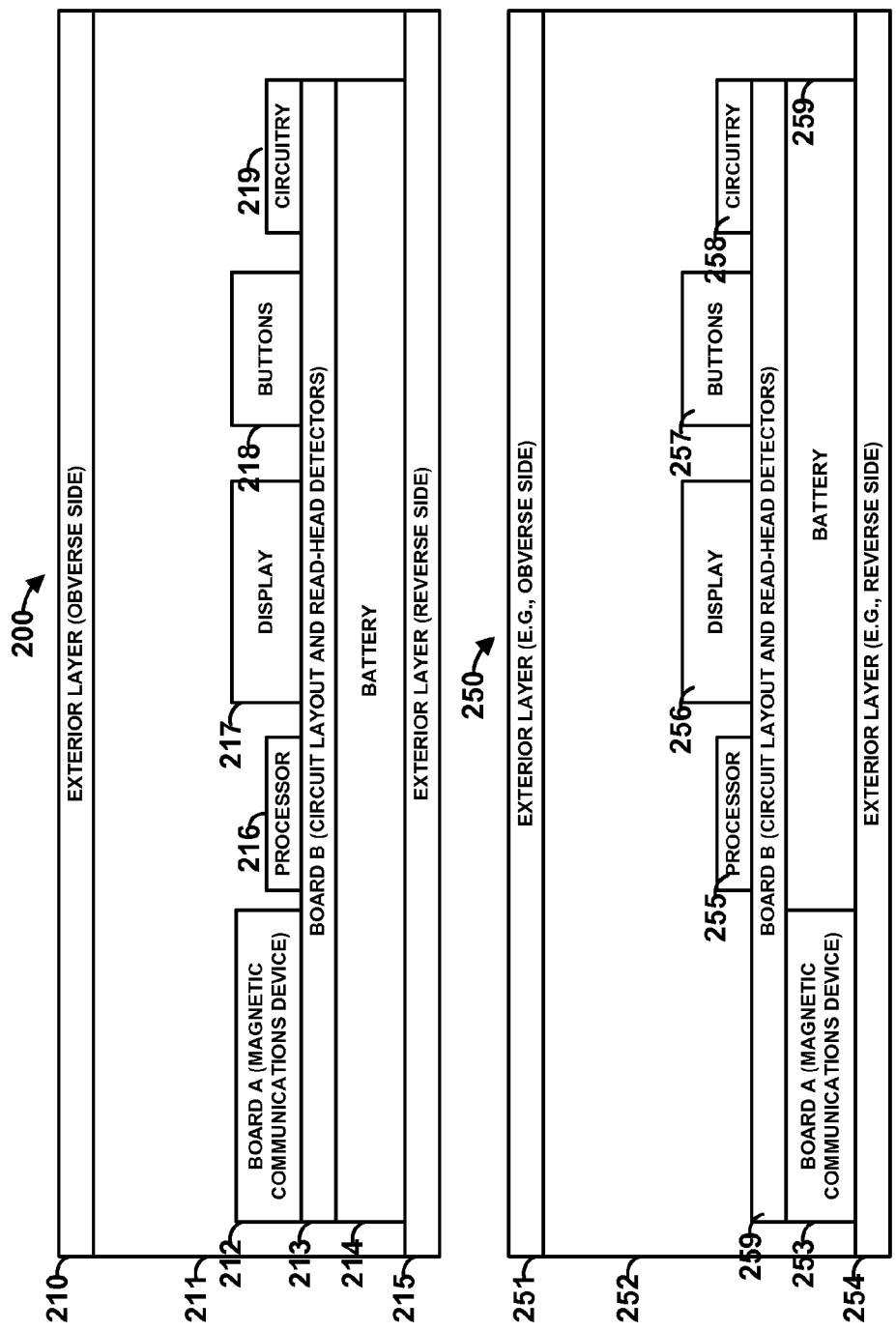
FIG. 2 is an illustration of a cards constructed in accordance with the principles of the present invention.

FIG. 2 shows card 200. Card 200 may be, for example, between 25 and 40 thousandths of an inch thick (e.g., approximately between 30 and 33 thousandths of an inch thick). Card 200 may include, for example, layer 210. Layer 210 may be a polymer, such as a polyethelene terephthalate. Similarly, layer 215 may be included as a polymer, such as polyethelene terephthalate. An electronics package may be fixed (e.g., glued) to layer 215 or 210 and laminated via injection molding (e.g., reaction injection molding) to form laminate 211. Laminate 212 may be formed from one or more polyurethane-based or silicon-based substances. To fabricate a card that is approximately 30 to 33 thousandths of an inch thick, for example, layer 215 and 210 may be approximately 5 to 7 thousandths of an inch thick (e.g., 5 thousandths of an inch thick). An electronics package may be less than approximately 10 to 20 thousandths of an inch thick (e.g., less than approximately 16 thousandths of an inch thick). Accordingly, for example, an area of laminate 211 between an electronics package and a layer may be a thickness such that an electronics package, layers 210 and 215 are approximately 33 thousandths of an inch thick. For example, laminate 211 may be approximately 3 to 10 thousandths of an inch thick (e.g., approximately 7 inches thick).

The volume of the electronics package of a powered card may, for example, less than approximately two tenths of a cubic square inch (e.g., approximately less than one tenth of a cubic square inch). Such an electronics package may include multiple flexible boards, a battery, dynamic magnetic stripe communications device, magnetic stripe communications device drive circuitry, and multiple light emitting diodes.

Persons skilled in the art will appreciate that a protective layer may be placed over layer 210 and 215. Such a layer may be between approximately 0.5 and 2 thousandths of an inch thick (e.g., approximately 1.5 thousandths of an inch thick). Accordingly, for example, the combined thickness of two protective layers may be approximately 3 thousandths of an inch, the combined thickness of two exterior layers may be approximately 10 thousands of an inch, the thickness of an electronics package may be approximately 16 thousandths of an inch, and the thickness of a laminate between an electronics package and an exterior layer may be approximately 4 thousands of an inch. Persons skilled in the art will also appreciate that an injection molding process of a substance may allow that substance to fill into the groove and gaps of an electronics package such that the laminate may reside, for example, between components of an electronics package.

Card 200 may include an electronics package that includes, for example, board 212, which may be a dynamic magnetic communications device, processor 216, display 217, buttons 218, additional circuitry 219, board 213, and battery 214. A permanent magnet may be, for example, provided as part of an assembled board 212 or fixed to the top of board 212. Board 213 may include, for example, capacitive read-head detectors placed about board 212. Battery 214 may be any type of battery, such as, for example, a flexible lithium polymer battery. Circuitry 219 may include, for example, one or more driver circuits (e.g., for a magnetic communications device), RFIDs, IC chips, light sensors and light receivers (e.g., for sending and communicating data via optical information signals), sound sensors and sound receivers, or any other component or circuitry for card 200. Read-head detectors for detecting the read-head of a magnetic stripe reader may be provided, for example, on board 212 and/or 214 as capacitive touch sensors (e.g., capacitive-sensing contact plates).

Card 250 may be provided and may include, for example, exterior layers 251 and 254, board 253, battery 259, board 259, processor 255, display 256, buttons 257, and circuitry 258. Circuitry 258 may include, for example, drive circuitry for display 217, drive circuitry for a dynamic magnetic stripe communications device, programming sensors (e.g., infrared sensors), and light emitting diodes. Components on a board may be coupled, for example, via surface mount assembly techniques, wire-bonding assembly techniques, and/or flip chip assembly techniques. The magnetic dynamic magnetic stripe communications device may, for example, be operable to communicate data to a read-head located on the side of layer 254 but not to a read-head located on the side of layer 251.

Persons skilled in the art will appreciate that read-head detectors may be included, for example on board 253 or a different board (e.g., a board provided between board 253 and layer 254). Read-head detectors for detecting the read-head of a magnetic stripe reader may be provided, for example, on board 253 and/or 259 as capacitive touch sensors (e.g., capacitive-sensing contact plates).

Figure 3:
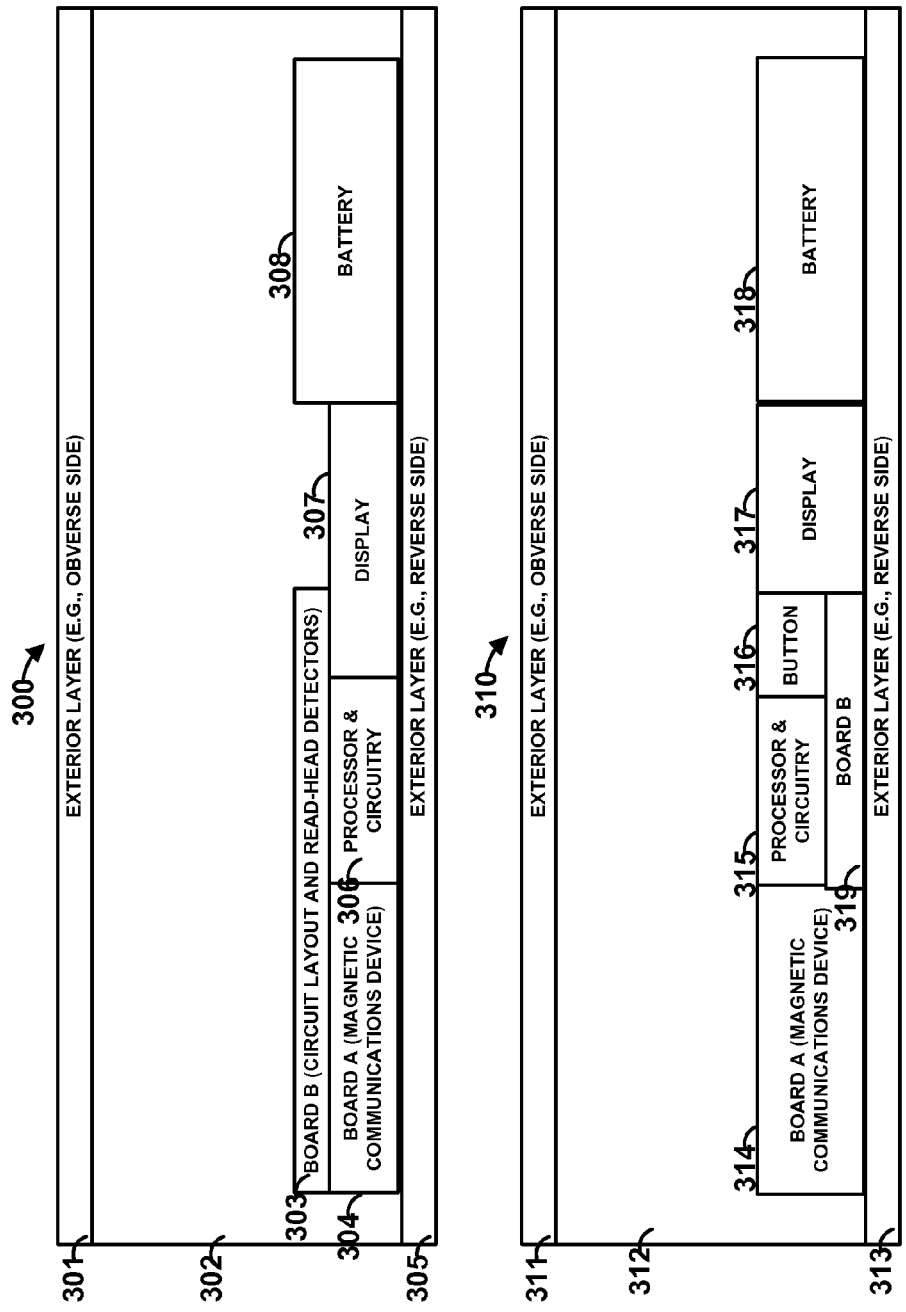
FIG. 3 is an illustration of cards constructed in accordance with the principles of the present invention.

FIG. 3 shows card 300. Card 300 may include, for example, layers 301, laminate (e.g., injected laminate) 302, layer 205, board 303, board 304, processor and circuitry 306, display 207, and battery 308. Board 303 may include, for example, contacts for capacitive sensing via capacitive sensing algorithms and circuitry in the processor. Accordingly, the processor may determine the capacitive of capacitive sensing contacts on board 303 in order to determine, for example, when an object passes in front of such capacitive sensing contacts. Additional circuitry may be included in processor and circuitry 306 such as, for example, circuitry for any displays, coils of a dynamic magnetic stripe communications device, light emitting diodes, infrared programming sensors, or any other electrical card components.

Persons skilled in the art will appreciate that the capacity of a battery may be extended by extending the thickness of a battery and providing for no overlap of a board (e.g., board 303 or 304) over battery 308. Persons skilled in the art will also appreciate that the capacity of a battery may be extended by supercharging the battery. Particularly, a battery may be a rechargeable battery with a nominal supply voltage (e.g., approximately 3-3.8 volts). Such a battery may be supercharged to a larger voltage (e.g., approximately 3.9-4.4 volts) and discharged once over a period of time (e.g., approximately two to four years). Accordingly, any negative effects of the supercharge may be minimized as the battery may not, for example, be recharged again after being encapsulated into a card by laminate.

Card 310 may include, for example, layer 311, layer 313, laminate 312, board 314, board 319 (e.g., for interconnections of processor and circuitry 315 and 316) display 317, and battery 318. Persons skilled in the art will appreciate that interconnections may exist between board 314 and board 319. A layer of board 314 may extend, for example, over board 319. Alternatively, for example, contacts of board 314 may be wire-bonded to contacts of board 319. Processor 315 may control components of board 314 by sending signals through, for example, board 319. For example, processor 315 (e.g., and associated drive circuitry) may drive a dynamic magnetic stripe communications fabricated at least partially, for example, on board 314.

Driving circuitry for a dynamic programmable magnetic stripe communications device may provide and remove current from a coil of a dynamic magnetic stripe communications device. Such current may be applied and removed in a fashion such that data is communicated serially through the coil in a frequency/double-frequency (F2F) encoded scheme. Accordingly, a magnetic stripe reader operable to discern F2F encoded data may receive and discern signals from the dynamic magnetic stripe communications device. Similarly, control circuitry may reverse the direction of current in a coil of a dynamic magnetic stripe communications device in order to, for example, communicate F2F encoded data via the flux transversals of the electromagnetic fields generated by such a coil. Drive circuitry may be operable to control current through multiple coils of a dynamic magnetic stripe communications device such that, for example, multiple tracks of data may be serially transmitted to a magnetic stripe reader. Any board, such as board 314, may be a flexible multiple layer printed circuit board. Such multiple layers may have printing, for example, on both sides of each layer or only on the exterior sides of each layer. Any board, such as board 319, may be a flexible single layer printed circuit board. Such single layer boards may have printing, for example, on both sides of each layer or only a single side.

Figure 4:
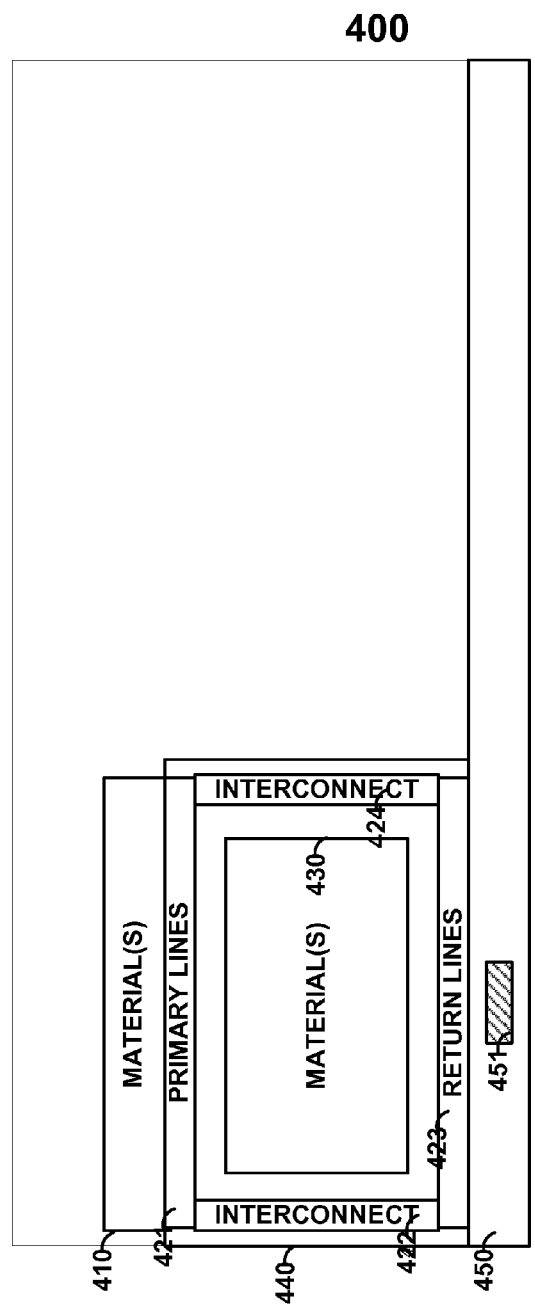
FIG. 4 is an illustration of a card constructed in accordance with the principles of the present invention.

FIG. 4 shows card 400. Card 400 may include, for example materials 410 (e.g., one or more permanent magnets), multiple layer board 440 that may include one or more coils comprised of primary lines 421, return lines 423, and interconnect lines 422 and 424. Sandwiched between multiple layers may be materials 430. Materials 430 may include one or more strips of material (e.g., three strips of a material such as a soft-magnetic material). Persons skilled in the art will appreciate that more than two layers of a board may be utilized to produce a coil and that an aperture may be cut in particular layers such that materials 430 may fit into such layers. Materials 430 may be, for example, more than one strips (e.g., three or four strips) of a cobalt-based amorphous material. Materials 410 may be, for example, one or more layers of a neodymium magnet. In this manner, a dynamic magnetic stripe communications device may be provided via the multiple layer board including lines 421-424, materials 430, and attached to materials 410. One or more materials 410 may be fixed (e.g., glued via an adhesive) to the surface of the flexible, multiple layer printed circuit board.

Persons skilled in the art will appreciate that board 450 may be mechanically and electrically coupled to the dynamic magnetic stripe communications device. Board 450 may include, for example, capacitive sensing contact 451. Board 450 may be a single or multiple layer board. The layers of board 450 may include printing on each side or a single side. For example, board 450 may be a single layer board with dual-face printing. Capacitive sensing contact 451 may be located, for example, on the surface of board 450 opposite the surface connected to the dynamic magnetic stripe communications device. A processor, battery, manual input interfaces (e.g., buttons), and additional circuitry (e.g., a display, display driver, magnetic stripe communications device drive circuitry) may be electrically and mechanically coupled to board 450.

Figure 5:
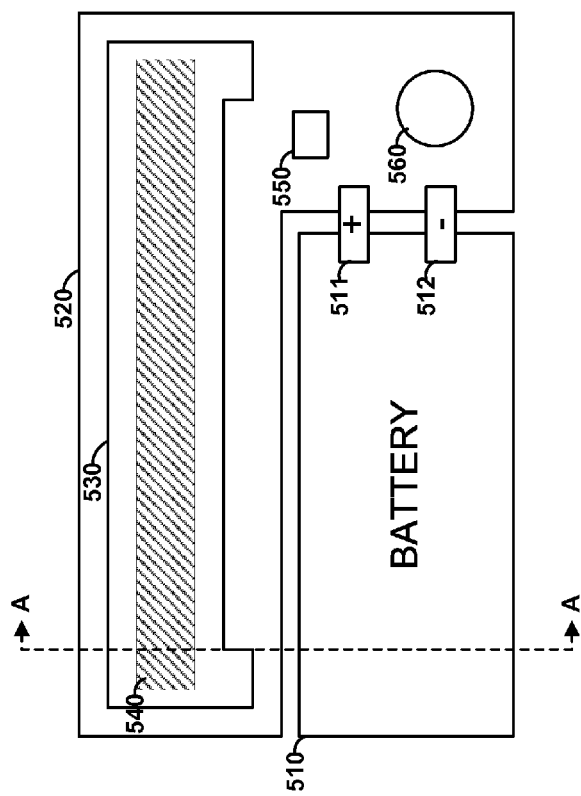
FIG. 5 is an illustration of a card constructed in accordance with the principles of the present invention.

FIG. 5 shows card 500 that may include, for example, board 520, board 530, permanent magnet 540, processor 550, button 560, battery 510, and battery leads 511, and 512. Such components may be laminated via injection molding, for example to form a card. For example, the electronics package of card 500 may be fixed to a polymer layer and liquid laminate injected above this polymer layer and an additional layer. The liquid laminate may be hardened. Alternatively, for example, layers of laminated may be cut with apertures corresponding to components and bonded together via temperature and pressure. Board 530 may include, for example, two or three coils. Each coil may have material inside the coil (e.g., three strips of a soft-magnetic material). Permanent magnet 540 may be placed across all such coils. Persons skilled in the art will appreciate that magnet 540 may be positioned over a single coil. Multiple magnets may be provided where, for example, each magnet is positioned over a coil.

Additional circuitry may be provided on board 520. For example, a display, display driver, driver circuitry for a dynamic magnetic stripe communications device, light emitting diodes, light sensors, infrared sensors and transmitters, capacitive sensing contacts, and any type of button may be provided on board 520.

Figure 6:
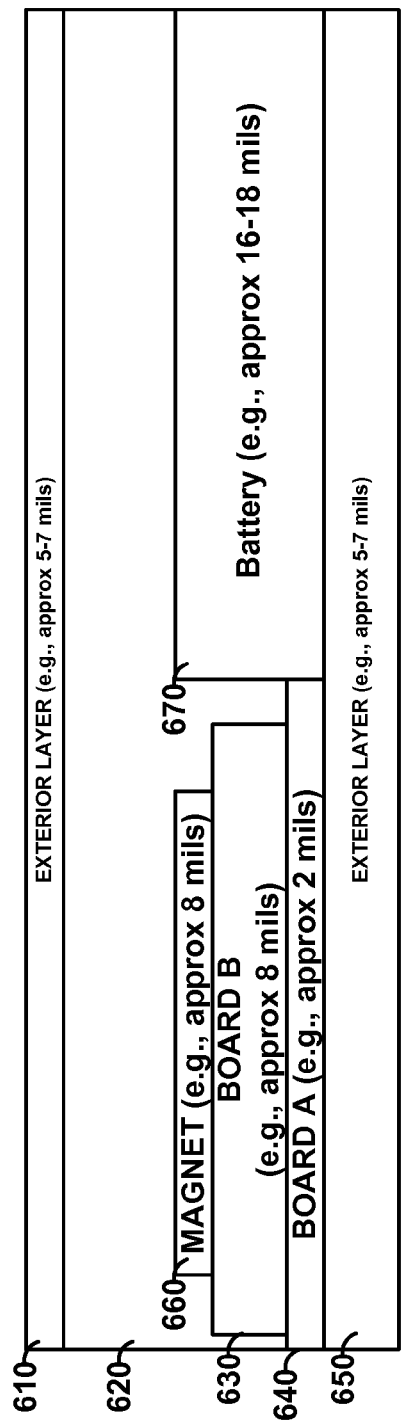
FIG. 6 is a flow chart of a card constructed in accordance with the principles of the present invention.

FIG. 6 shows card 600 that may be, for example, cross section "A-A" of card 500 of FIG. 5. Persons skilled in the art will appreciate that layers 610 and 650 may be less than approximately 5 thousandths of an inch thick (e.g., approximately 2-5 thousandths of an inch thick). Persons skilled in the art will appreciate that laminate 620 may be utilized in place of layers 610 and 650. Information (e.g., payment card numbers, user name, etc.) may be printed, embossed, or laser engraved on a portion of a card.

For example, information may be printed on layers 610 and 650 and then covered by a protective layer. Card 600 may include, for example, magnet 660, board 630, board 640, and battery 670. Board 630 may include, for example, one or more coils for serially communicating data. Materials may be placed inside such coils. For example, board 630 may be a two-layer board stuffed with multiple strips of material. Electrical contacts may be provided on, for example, the exterior surfaces and interior surfaces of both board layers. Board 640 may be a single layer board, but, however, may include contacts on both surfaces of board 640.

Board 640 may be, for example, approximately 3 to 4 thousandths of an inch thick. More particularly, for example, board 640 may be approximately 3.4 thousandths of an inch thick. Layers 610 and 650 may have, for example, a thickness of approximately 4 to 8 thousandths of an inch (e.g., approximately 5 thousandths of an inch). Magnet 650 may have, for example a thickness between approximately 6 and 10 thousandths of an inch (e.g., approximately 6 to 8 thousandths of an inch). Board 630 may have a thickness of approximately 9 to 12 thousandths of an inch (e.g., approximately 8 thousandths of an inch). Board 640 may have a thickness of approximately 2 to 4 thousandths of an inch (e.g., approximately 3 to 3.5 thousandths of an inch). Battery 670 may have a thickness, for example, of approximately 15 to 18 thousandths of an inch (e.g., approximately 16 thousandths of an inch). The combined thickness of magnet 660, board 630, and board 640 may be, for example, approximately 14 to 18 thousandths of an inch thick (e.g., approximately 16 thousandths of an inch thick) while the thickness of battery 670 may also be approximately 16 thousandths of an inch thick.

Persons skilled in the art will appreciate that electromagnetic signals may communicate data from one side of card 600 but not both sides of card 600 (or both sides of card 600). For example, electromagnetic signals, operable to be read by a magnetic stripe reader, may be communicated outside of layer 650, but not outside of layer 610. Persons skilled in the art will appreciate that layers 610 and 650 may include multiple individual layers of polymer. Such individual layers may include different types of polymer layers.

Figure 7:
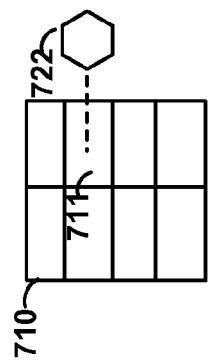
FIG. 7 is an illustration of a programming adapter constructed in accordance with the principles of the present invention.

FIG. 7 shows IC interface 710 for programming an IC chip. Area 711 may be utilized, for example, to communicate program data electronically to an IC chip. Adapter 722 may, for example, include a light-emitting device activated upon receiving electronic signals from area 711. Accordingly, an IC chip programming port may be utilized to optically program a card (or other device). One or more light sources may be utilized to communicate data optically from one or more contacts of a IC chip programming port. An IC chip may have multiple exposed contacts (e.g., six, eight, or ten).

An embedded processor in a card may be coupled to external contacts that may be positioned to electrically communicate with contacts of an IC chip card reader. Light transmitters (e.g., infrared or visible light transmitters) and light receivers (e.g., infrared or visible light receivers) may be coupled to the contacts of a card and/or the contacts of an IC card reader to communicate data wirelessly between an IC card reader and a card. Programming data may be, for example, communicated wirelessly such as personal data (e.g., payment card number and associated data for multiple data tracks).

Figure 8:
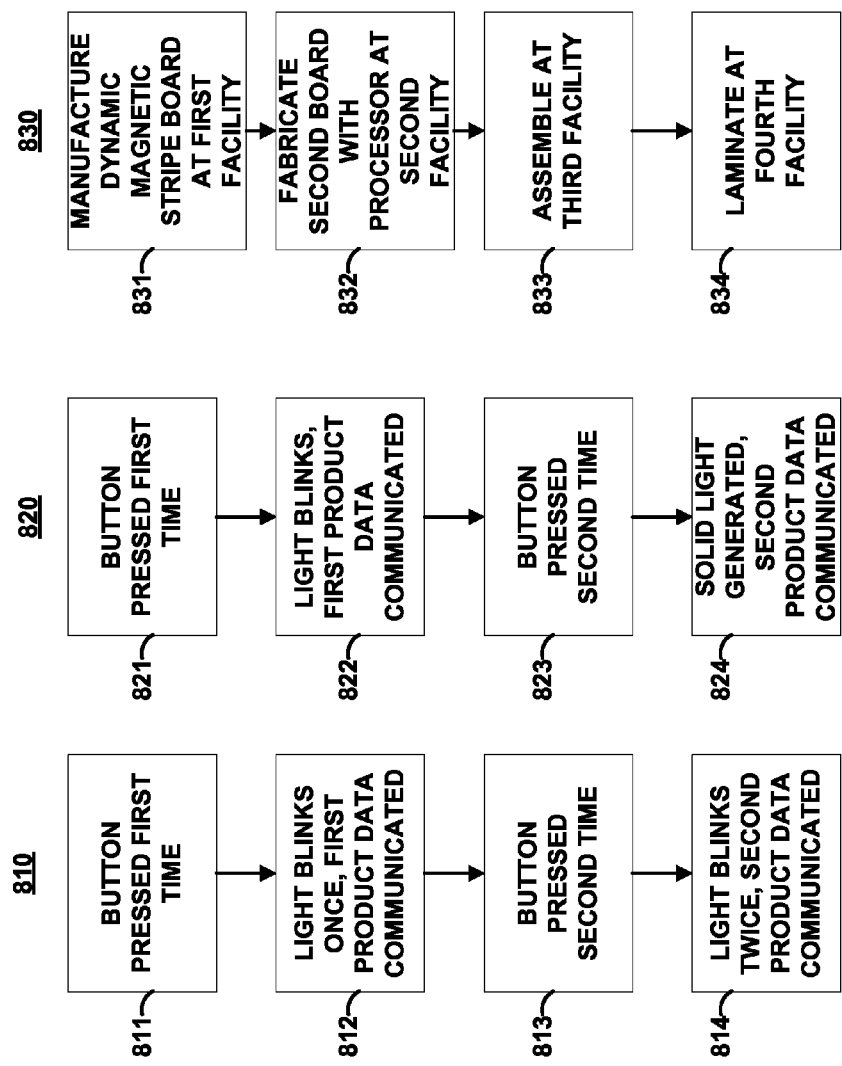
FIG. 8 is an illustration of process flow charts constructed in accordance with the principles of the present invention.

FIG. 8 shows processes 810, 820, and 830. Process 810 may be provided and may include steps 811-814. Step 811 may be included, in which a button on a card may be pressed.

Persons skilled in the art will appreciate that a single button may be provided on a card (or multiple buttons). Step 812 may ensue, in which a light blinks once and data associated with one product is communicated via an output device (e.g., via a dynamic magnetic stripe communications device communicating data serially after a read-head detector detects the presence of a read-head). Step 813 may occur, in which a button (e.g., that same button) is pressed a second time. Step 814 may follow, in which a light source (e.g., that same light source) may blink twice and data associated with a second product may be communicated through a dynamic magnetic communications device. Persons skilled in the art will appreciate that, in this manner, a single button may toggle between different states where a different product may be communicated through a dynamic magnetic stripe communications device with each different state. A user may be provided with an indication as to the state, for example, visually via a light sensor or display, tactilely via a vibrating device, or audibly via a speaker. Different cards (e.g., different payment cards) or different card features may be associated with different manual inputs (e.g., toggling a single button). Accordingly, different payment card numbers and/or different discretionary data may be communicated through a dynamic magnetic stripe communications device or other output device (e.g., IC chip and/or RFID antenna). Such information may also be displayed on one or more displays located on a card.

Multiple buttons may be provided on a card and associated, for example, with different payment cards (e.g., different payment card numbers, discretionary data, and associated data). A user may press a button and a source of light (e.g., an LED) may emit a constant source of light for a period of time (e.g., approximately 5-20 seconds such as approximately 10 seconds). The source of light may then blink for a period of time (e.g., approximately 5 to 20 minutes). In doing so, a card may conserve power from blinking light instead of, for example, emitting constant light for periods of time. During this time, a card may utilize read-head detectors to detect if a card is being swiped. If a read-head is detected, for example, a processor may utilize a dynamic magnetic stripe communications device to communicate magnetic stripe data to a magnetic stripe reader. Accordingly, a payment card or payment feature may be selected by a user via a button, acknowledged by a source of light, and a card may wait to be swiped for periods of time (e.g., approximately 20 minutes and 20 seconds). In doing so, a card may be selected by a user and handed, for example, to a waiter at a restaurant without requiring the waiter to make a selection on the card. After a card is swiped, for example, the card may wait to be re-swiped. The card, for example, may continue blinking light via a source of light (e.g., an LED next to the originally pressed button) for a period of time. This re-swipe time may be, for example, approximately 10 to 30 seconds (e.g., approximately 20 seconds). If, for example, the card was re-swiped while the LED was blinking, the card may detect the swipe and communicate data through the dynamic magnetic stripe communications device. The card may then, again, for example, wait to be re-swiped a period of time. Once the card is not swiped for the period of time the read-head detectors are attempting to detect a read-head, the card's processor may be placed in a sleep mode until a button is pressed.

Process 820 may be provided and may include steps 821-824. Step 821 may include a button being pressed one time. In step 822, a source of light (e.g., an LED) may blink continuously for a pre-determined period of time and data associated with a first product may be communicated (e.g., a credit card number and associated data such as associated discretionary data). In step 823, that same button, or a different button, may be pressed. In step 824, the source of light from step 822, or a different source of light, may emit light constantly and steadily for a period of time and data associated with a second product may be communicated (e.g., a debit card number and associated data such as associated discretionary data).

Process 830 may be provided and may include steps 831-834. Step 831 may be included, in which a single or multiple layer flexible printed circuit board is produced at a facility. A portion or all of a dynamic magnetic communications device may be provided from such a facility. Step 832 may be provided, in which a second single or multiple layer flexible board is provided from another facility. Components may be assembled onto one or multiple boards (e.g., the boards from steps 831 and 832) at step 833 at an assembler. Lamination may occur at such an assembling facility. Persons skilled in the art will appreciate that assembly of the boards from step 831 and 832 may be assembled at the second facility. This second facility may also, for example, laminate the assembled boards. Alternatively, for example, lamination may occur at yet another facility in step 834. Persons skilled in the art will appreciate that an assembling facility may affix multiple boards together as well as assemble electrical components onto one, more than one, or all of the boards affixed together.

A driving circuit may include, for example, a switching element such as a MOSFET. A feedback loop may be provided across such a MOSFET in order to provide a gradual increase and decrease in signal provided to a coil of a magnetic emulator. Such a feedback circuit may, for example, provide an intermediary transition period in a signal that is approximately, for example, 5 to 15 milliseconds (e.g., approximately 10 milliseconds) in length. The current of a drive signal to an emulator may be in the range of, for example, 50 mA to 150 mA (e.g., approximately 90-110 mA). The range of a voltage of a battery may be, for example, between approximately 2 and 4 volts (e.g., approximately 2.8 to 3.6 volts).

Figure 9:
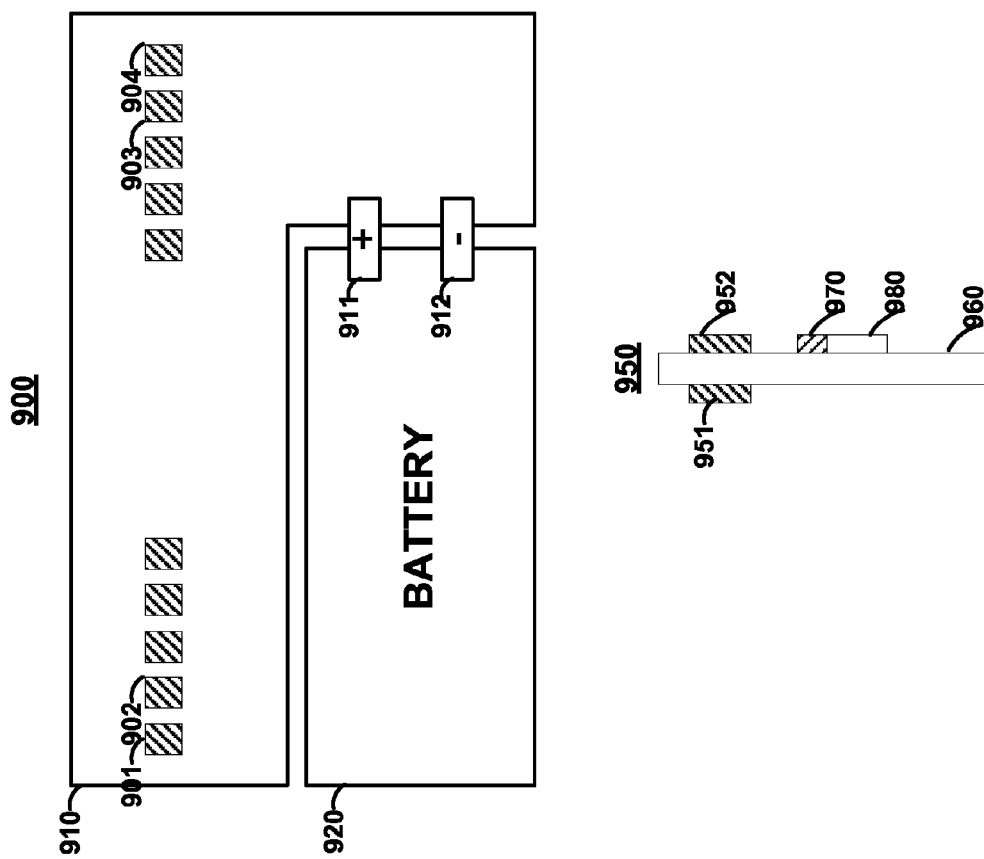
FIG. 9 is an illustration of a card constructed in accordance with the principles of the present invention.

FIG. 9 shows card 900 that may include, battery 920, battery leads 911 and 912, and a number of read-head detectors located near opposite edges of a card. For example, five read-head detectors may be provided on the left side of card 900 (e.g., including detectors 901 and 902) and five read-head detectors may be provided on the right side of card 900 (e.g., including detectors 903 and 904).

Persons skilled in the art will appreciate that card 900 may not include a mechanical button and that read heads may be utilized as capacitive touch interfaces for receiving manual input. For example, a cluster of read-head detectors (e.g., five read-head detectors on the left side of a card) may act as one capacitive touch interface. Another cluster of read-head detectors (e.g., five read-head detectors on the right side of a card) may act as another capacitive touch interface. Accordingly, a user may press the right side of the card (about the cluster) to enter one manual input and a user may press the left side of the card (about the cluster) to enter a second manual input. A cluster of capacitive touch interfaces may be translated as receiving manual input, for example, when multiple capacitive touch interfaces detect the presence of an object (e.g., finger). Receiving such input may, for example, cause the processor to utilize the cluster as read-head detectors for detecting a magnetic stripe read-head and communicate data using a dynamic magnetic stripe communications device when that read-head is detected. A read-head may be detected, for example, by sensing the movement of an object across the read-heads having a particular length. For example, capacitive sensors may detect a read-head moving along them and, accordingly, a processor may communicate data via a dynamic magnetic stripe communications device to the read-head. Structure 950 may be included, for example, and include a single or multiple layer board 960 that includes contacts 951 and 952 on exterior faces for capacitively detecting the presence of objects. To receive manual input, a processor may detect the presence of an object on both sides of a card in the same vicinity. To detect a read-head, a card may detect the presence of an object on one side of a card (e.g., a side of a card that is capable of communicating data to a magnetic stripe reader) and not detect the presence of an object on the other side of the card.

Stress gauge 970 may be utilized to determine when button 980 is being pressed from a card bending a past a particular threshold or button 980 is being pressed while a card is not bending beyond a particular threshold. Stress gauge 970 may be, for example, a piezoelectric element configured to produce a particular electrical voltage when bent a particular amount. Accordingly, a processor may acknowledge a button press as coming from a user when a stress gauge does not pass a threshold and may ignore button presses when a stress gauge does pass a particular threshold. Multiple stress gauges may be added to determine the different ways a card is being bent in order to change the operation of a card. For example, if a card is being bent to a point where the card may break, the card may notify a user of this situation (e.g., via a visual indication, tactile indication, or audible indication).

Persons skilled in the art will appreciate that a timer may be used to detect the number of button presses in a particular period of time from a single (or multiple) buttons. Different modes may be presented based on the number of pressed. For example, four presses in a period of time may indicate to a processor to enter a sleep mode.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein.

All such modifications are within the scope of the present invention, which is limited only by the claims that follow.

What is claimed is:

1. A payment card comprising:
   a two-layer board comprising a coil having an interior core fabricated from multiple layers of a carbon-based alloy;
   a permanent magnet provided on a first surface of said two-layer board about said coil; and
   a single-layer board fixed to said two layer board, wherein a processor is fixed to said single layer board.

2. The payment card comprising of claim 1, wherein an electromagnetic signal is produced on a second surface of said two-layer board about said coil representative of magnetic stripe data and operable to be read by a magnetic stripe reader.

3. The payment card comprising of claim 1, wherein an electromagnetic signal is produced on a second surface of said two-layer board about said coil representative of magnetic stripe data and operable to be read by a magnetic stripe reader and said electromagnetic signal is not operable to be detected above said permanent magnet provided on said first surface of said two-layer board.

4. The payment card comprising of claim 1, further comprising a button and a stress gauge provided in the proximity of said button.

5. The payment card comprising of claim 1, further comprising a button and a stress gauge provided in the proximity of said button, wherein a processor determines the receipt of user input when a first signal is received from said button and said stress gauge determines that bending beyond a threshold did not occur.

6. The payment card comprising of claim 1, further comprising a button and a stress gauge provided in the proximity of said button, wherein a processor determines the receipt of non-user input when a first signal is received from said button and said stress gauge determines that bending beyond a threshold did occur.

7. The payment card comprising of claim 1, further comprising a button, a first stress gauge, and a second stress gauge, wherein said first and second stress gauges determine a breaking point and a visual indication is provided indicative of said breaking point being reached.

8. A powered card comprising:
- a two-layer board comprising a coil having an interior core comprising a material;
- a permanent magnet provided on a first surface of said two-layer board about said coil;
- a single-layer board fixed to said two layer board, wherein a processor is fixed to said single layer board; and
- a battery electrically and mechanically coupled to said single-layer board; and
- laminate about at least a portion of said two-layer board, said permanent magnet, said single-layer board, and said battery.

9. The powered card of claim 8, wherein said laminate was applied to said two-layer board, said permanent magnet, said single-layer board, and said battery in liquid form and then hardened.

10. The powered card of claim 8, wherein each layer of said two layer board includes a single printed surface.

11. The powered card of claim 8, wherein both surfaces of said single layer board are printed.

12. The powered card of claim 8, wherein each layer of said two layer board includes a single printed surface and both surfaces of said single layer board are printed.

13. The powered card of claim 8, wherein said material is a soft magnetic material.

14. The powered card of claim 8, further comprising a mechanical button and light emitting diode.

15. The powered card of claim 8, wherein the thickness of said single-layer board is two to four thousandths of an inch.

16. The powered card of claim 8, wherein the thickness of said multiple layer board is less than eight thousandths of an inch.

17. The powered card of claim 8, wherein the thickness of said permanent magnetic is less than eight thousandths of an inch.

\* \* \* \* \*